Jan. 12, 1937.  R. J. PLAISTED  2,067,413
TIME DELAY POWER CONTROL SYSTEM AND APPARATUS
Filed Oct. 22, 1934

INVENTOR.
Ross J. Plaisted.
BY Slough and Canfield
ATTORNEY.

Patented Jan. 12, 1937

2,067,413

UNITED STATES PATENT OFFICE 2,067,413

TIME DELAY POWER CONTROL SYSTEM AND APPARATUS

Ross J. Plaisted, Brecksville, Ohio, assignor to Aircraft Service, Inc., Cleveland, Ohio, a corporation of Ohio Application October 22, 1934, Serial No. 749,498

4 Claims. (Cl. 175—320)

This invention relates to electrical systems and apparatus for effecting the application of power in response to variations of a fluctuating variable factor and for rendering ineffective fluctuations of less than predetermined minimum duration.

The invention has particular application to the intermittent application of power to move a massive wind T at an airport to maintain it in true wind-direction-indicating position in response to changes of position of a pilot wind vane fluctuatingly movable by wind gusts and wherein the T is prevented from responding to changes of position of the vane enduring for less than a predetermined time interval.

Among the objects of the invention are:

To provide generally an improved electrical system and apparatus of the class referred to;

To provide an improved control system and apparatus for determining the position of airport wind-direction-indicating Ts;

To provide an improved time interval producing means;

To provide an improved electric system and apparatus for producing predetermined time intervals;

To provide an improved electric control system and apparatus for repeatedly initiating the running of a time interval at each of the successive fluctuations of a fluctuatingly movable element and for effecting the application of power upon the duration of the time interval beyond a predetermined minimum.

My invention is fully disclosed in the following description taken in connection with the accompanying drawing in which.

Figures 1, 2:
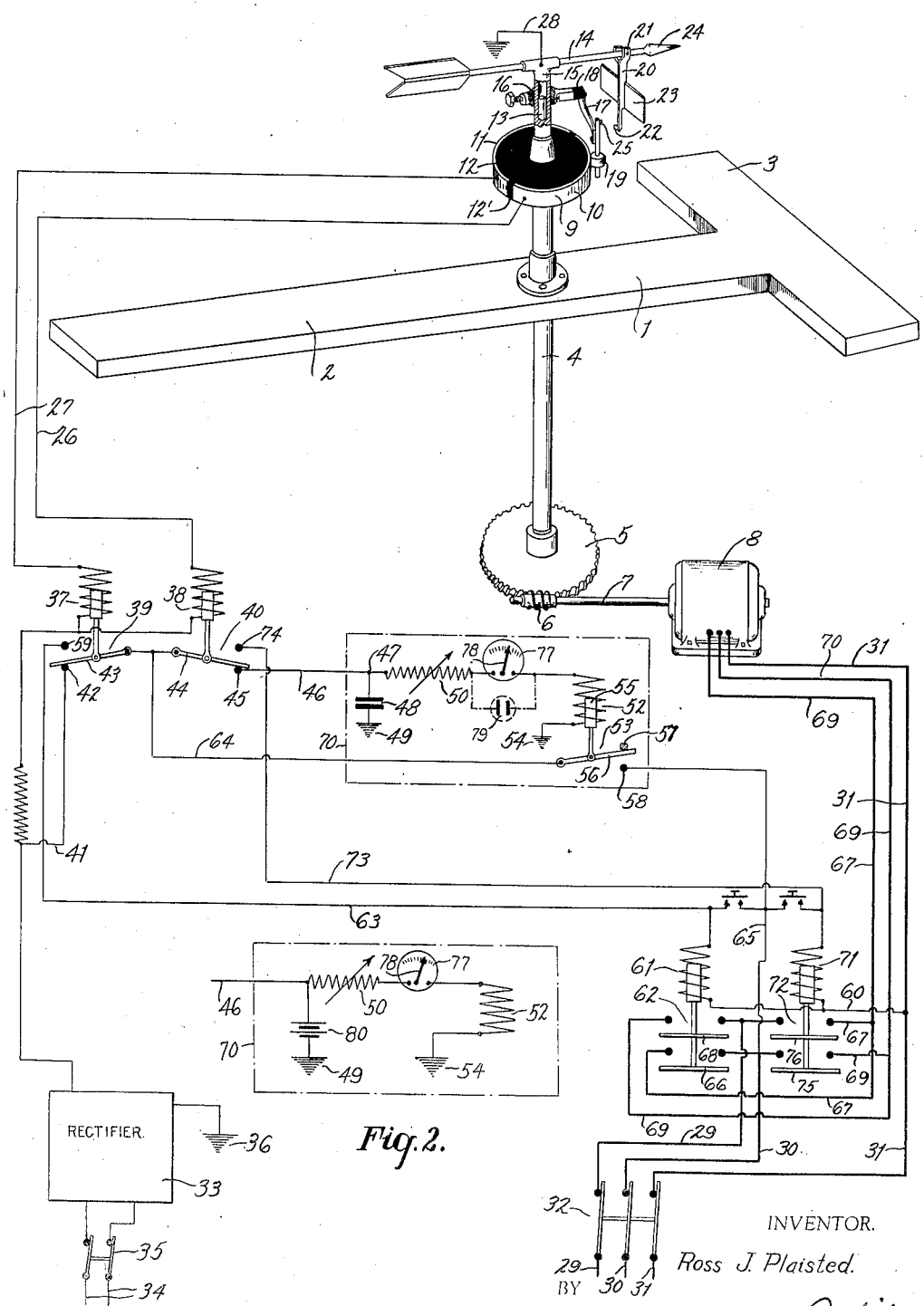
Fig. 1 is a diagrammatic representation of an apparatus and electrical system embodying my invention as applied to the control of a wind-direction-indicating T at an airport.
Fig. 2 is a view similar to a part of Fig. 1 illustrating a modification.

In the drawing at 1 is indicated a massive wind T disposed generally parallel to the ground, large enough to be plainly seen at relatively great elevation by aviators in the air, and generally simulating by the stem 2 and head 3 the fuselage and wings of an airplane whereby its directional position may indicate to an aviator in the air the position into which he should maneuver his plane to effect a landing into the wind. The T is rigidly connected to a vertical shaft 4 carrying a worm gear 5 meshed with a worm 6 on the shaft 7 of an electric motor 8. By energizing the motor 8 alternately to revolve in opposite directions, the wind T 1 may be rotated clockwise or counterclockwise to change its position.

The shaft 4, extending above the T 1, carries a commutator 9 comprising circular conductor sectors 10 and 11 insulated from each other and from the shaft 4 by insulation 12. Above the commutator the shaft terminates in a reduced diameter portion 13 upon which is oscillatably mounted an arrow 14 by a sleeve 15 depending therefrom and telescoped on the portion 13 of the shaft.

A head 16 is clamped on the sleeve 15 and carries a depending resilient arm 17 insulated from the head 16 by a block of insulation 18 and carrying at a lower portion thereof a roller type brush 19 adapted to roll on the commutator segments 10 and 11. An arm 20 is pivotally supported on the arrow 14 as at 21 and on its lower end carries a contact 22 and is provided with a wind vane 23. The arrow 14 is adapted to be aligned with the wind direction to present the head 24 of the arrow to the wind and thus the vane 23 is at all times presented broadside to the wind whereby the arm 20 may swing around the pivot 21. Upon the attainment of wind velocity above a predetermined minimum, the wind pressure on the vane 23 will move the contact 22 into engagement with a contact 25 on the arm 17.

A change of wind direction will cause the arrow 14 to rotate on its vertical axis to a new position thereby rolling the brush 19 from a neutral position on a portion of the insulation 12' to one or the other of the segments 10 and 11 as illustrated in the drawing, and electric current may then flow correspondingly over one or the other of the wires 26 or 27 to the corresponding segment, thence by way of the brush 19 and contacts 25—22 to the arrow 14 and thence to ground as indicated at 28. By means to be described, the current thus flowing is utilized to actuate electro-magnetic switches whereby power from alternating current supply mains 29, 30 and 31 may flow through a line switch 32 through the motor 8, causing it to rotate in a predetermined direction, thereby moving the wind-T to a new position. Movement of the T is transmitted to the commutator segments 10 and 11 and will move them under the brush 19 until it rests upon the neutral position insulation 12' whereupon the said current will be interrupted, power to the motor 8 will be discontinued, and the T will remain in its new position.

Thus each movement of the arrow 14 by change of direction of wind will result in a corresponding movement of the T1 to a corresponding new position. But if the wind be below the predetermined velocity at which it is immaterial in what direction an aviator may land on the field, the contacts 22—25 will remain open and automatic movement of the T 1 will be discontinued.

A potential transformer and rectifier apparatus or other source of direct current, such for example as a direct current generator or a rotary converter is provided, indicated generally by the rectangle 33 supplied with energy from alternating current mains 34 through a line switch 35. When the roller brush 19 is moved to either of the segments 10 or 11 as described, current may flow over a circuit including a ground connection 36, through the power supplying element of the rectifier 33, and through a switch winding 37 over the wire 27 to ground 28 or through a switch winding 38 over the wire 26 and to ground 28, the selection being determined by the direction in which the arrow 14 is moved from its normal position by a change of wind direction.

Assuming first that both of the windings 37 and 38 are de-energized by a corresponding position of the arrow 14, the switches 39 and 40 controlled respectively by the windings 37 and 38 will be in normal positions illustrated and current may flow by a wire 41 through contact 42 and switch arm 43 of relay 39 and thence through switch arm 44 and contact 45 of relay 40, and by way of wire 46 to the point 47 at which the current has two paths in parallel to ground, one path through a condenser 48 to ground at 49 and the other through a variable resistance 50, and winding 52 of a time controlled switch 53, and thence to ground at 54.

This current will be uni-directional as explained above and will charge the condenser 48 and also energize the winding 52 causing it to raise its armature 55 moving the switch arm 56 upwardly against a stop 57 and out of engagement with its contact 58. This will be the normal positions of the parts.

Upon energizing either of the windings 37 or 38, they will move their switch arms 43 and 44 to open the circuit at either the contact 42 or the contact 45 interrupting the supply of current to the point 47. Thereupon the condenser 48 begins to discharge causing current to flow in the local circuit from the condenser 48, through resistance 50, winding 52 and back to the condenser by way of grounds 54 and 49, maintaining the winding 52 energized sufficiently to hold the arm 56 against the stop 57. The discharge current gradually diminishes and after a predetermined time interval is no longer sufficient in the winding 52 to hold the switch 53 open and at the end of that interval it closes. The extent of this time can be predetermined by the capacity of condenser 48 and the adjustment of the variable resistance 50.

Assuming now that the arrow 14 moves from the neutral position on the insulation portion 12', to the segment which will cause energization of the relay winding 37 as above described, the switch arm 43 will thereby be raised breaking current at the contact 42 and engaging contact 59. The time interval above described will thereby be initiated and also a circuit will be made through a wire 60 which is connected to supply main 31 through the energizing winding 61 of a reversing switch 62, thence by wire 63 to contact 59 and through switch arm 43, a wire 64 to the switch arm 56. Pending the termination of the time interval, this circuit is interrupted at the contact 58 but after the time interval has run, the arm 56 will engage the contact 58 and then the circuit will be completed through the arm and contact and by way of a wire 65 to another of the supply mains 30. The switch 62 will thereby be closed and power current may flow through the main switch 32 and by wire 30 through the lower bar 66 of the switch 62 and thence by wire 67 to the motor; and current may also flow from the supply main 29 through the upper bar 68 of the switch 62, and thence by wire 69 to the motor. Current may at all times be supplied from the main 31 to the motor.

The motor will thus be started and will turn the wind T 1 until the current in the wire 27 is interrupted on the commutator by the contacts 19 rolling upon the neutral insulation portion 12' whereupon the relay 39 will be restored to its normal position, de-energizing the winding 61 and causing the motor current to be broken at the upper and lower bars 68 and 66 of the reversing switch 62 whereupon the motor will stop.

If, at any time during the running of the time interval, the arrow 14 should de-energize the winding 37, the switch arm 43 will fall and engage the contact 42 and the condenser 48 will have its charge restored before the switch 53 closes, and the switch 53 will be prevented from closing.

I have found that a suitable interval is six seconds or less and this can readily be obtained without undue size and expense of the parts producing the time interval. These parts may be considered as a time interval producing unit and are identified as enclosed within the broken line rectangle 70.

If, instead of energizing the winding 37, the arrow effects energization of the winding 38, the switch arm 44 will be raised, breaking current to the time delay unit 70 at the contact 45 and starting the time interval. Unless the switch arm 44 is restored by de-energization of the winding 38 before the time interval has run, current may flow from the wire 60 through the winding 71 of the other reversing switch 72 and by way of a wire 73 may flow to the contact 74 through the switch arm 44 and by way of wire 64 as before through the switch arm 56 and contact 58 and wire 65, thereby closing the reversing switch 72. Power current will then flow from supply main 30 through the lower bar 75 to the current main 69, and from supply wire 29 through the upper bar 76 to motor supply main 67. This will energize the motor 8 in the reverse of its former direction and move the T reversely for the purposes above set forth.

The operation of the control system and apparatus will now be apparent. The fluctuatingly moving arrow may alternately energize the wires 27 and 26, alternately operating the relays 39 and 40 to alternately operate the reversing switches 62 and 72, to operate the motor 8 in alternate directions to swing the T 1 in one direction or the other. In each instance, however, upon the operation of a relay 39 or 40, current supplied to the time delay system 70 is interrupted to initiate discharging of the condenser 48 and start the time interval running. If the fluctuating arrow 14 is not restored by a reverse fluctuation before the end of the time interval, the switch 53 will close and permit the motor to be energized as stated; but if the fluctuating arrow returns before the time interval is completed, the corresponding relay will be deenergized to effect opening of the motor circuit on the corresponding reversing switch 62 or 72 before current has flowed therethrough to the motor, and the condenser 48 will again be charged preparatory to the initiation of another time interval. The T 1, therefore, is not moved by the motor during the fluctuating movement of the arrow 14 unless and until it remains in a fluctuated position on one side or the other of neutral for the predetermined time interval or longer, and even then is moved only sufficiently to restore the arrow relatively to the neutral position.

It will now be clearly apparent furthermore that the reversing switches 62 and 72 will remain open and inert because the windings 61 and 71 thereof are not energized during fluctuations of the arrow 14 and alternate operations of the relays 39 and 40 except when the time interval has completely run. Thus in the normal operation of the apparatus, the only parts which move repeatedly as the arrow 14 fluctuates will be the relays 39 and 40, and these may be made small and quiet in operation so that the entire system will be in general inert and inactive except when it functions to move the massive T 1.

In connection with the time interval producing unit 70, means may be provided to indicate the operation thereof. In the preferred form, I place an ammeter 77 in series with the winding 52, the indicating finger 78 of which will indicate maximum of flow of current in the normal state of the apparatus. When supply to the unit 70 is broken at the contact 45 or 42, and the time interval begins to run, the decaying current to the winding 52 will be indicated on the instrument 72 by gradual movement toward the left of the finger 78, the finger reaching an extreme position toward the left when the time interval has been completed. By such means the time interval may be timed and accordingly predetermined by adjusting the resistance 50; and likewise the instrument 77 will indicate whether the system is properly operating or has become defective.

In place of the instrument 77, a glow discharge lamp 79 may be employed and will indicate by the intensity of the illumination thereof the amount of current flowing and thus will indicate not only whether the system is properly operating but also the length of the time interval in a manner similar to that described for the instrument 77.

In Fig. 2 I have illustrated a modification in which, instead of the condenser 48, a storage battery 80 is employed. Any suitable number of cells may be provided for the desired voltage and the plates of the battery may be of relatively small amperage capacity so as to substantially completely discharge in the desired time interval, the time interval being again adjustable by the resistance 50 which will vary the discharge amperage.

My invention is not limited to the exact details of construction shown and described. Modifications and changes may be made without departing from the spirit of my invention or sacrificing its advantages and my invention comprehends all such modifications and changes included within the scope of the appended claims.

I claim:

1. An electric system for effecting operation of a first electro-magnetic switch in response to movements of a two-position switch, comprising a normally unoperated electro-magnetic switch controlling energization of the first switch jointly with the two-position switch in one position thereof, an electric energy storage means, circuit means and a control current source for energizing the normally unoperated switch in parallel with the energy storage means to operate the normally unoperated switch and hold it operated under control of the two-position switch in its other position, whereby when the two-position switch moves to said other position, the normally unoperated switch will be operated and held operated and the energy storage means will be charged and remain charged, and the first switch will be restored or remain unoperated, and when the two-position switch moves to the said one position, the energy storage means will discharge through the winding of the normally unoperated switch and permit it to move to unoperated position after a predetermined time interval, whereupon the first electro-magnetic switch may operate under joint control of the normally unoperated switch and of the said two-position switch in the said one position thereof.

2. An electric system for effecting operation of a first electro-magnetic switch in response to movements of a two-position switch having normally closed and normally open contacts, comprising a normally closed electro-magnetic switch controlling energization of the first switch jointly with the two-position switch through the normally open contacts thereof, an electric energy storage means, circuit means and a control current source for energizing the normally closed switch winding in parallel with the energy storage means to open the normally closed switch and hold it open under control of the normally closed contacts of the two-position switch, whereby when the two-position switch moves to close the normally open contacts, the normally closed switch will be opened and held opened and the energy storage means will be charged and remain charged and the first switch will be unenergized, and when the two-position switch moves to close the normally open contacts, the energy storage means will then discharge through the winding of the normally closed switch and permit it to close after a predetermined time interval, whereupon the first electro-magnetic switch may be energized under the joint control of the normally closed switch and of the now closed normally open contacts of the two-position switch.

3. In an electric system, a main circuit to be controlled, a first electro-magnetic switch for controlling the main circuit, a two-position switch having an unoperated and an operated position, a delayed operation electromagnetic switch having a normally unoperated position in which jointly with the two-position switch in its operated position controls operation of the first switch, the winding of the delayed operation switch having an electric energy storage means in parallel therewith and both the energy storage means and the winding of the delayed operation switch being controlled by the two-position switch in its unoperated position, whereby when the two-position switch is unoperated, the energy storage means and the winding of the delayed operation switch may be energized and remain energized to operate the delayed operation switch to prevent operation of the first switch, and, upon movement of the two-position switch to its operated position, energy from the energy storage means may discharge through the winding of the delayed operation switch permitting it to operate after a predetermined interval and thereupon to cause, jointly with the two-position switch in its operated position, operation of the first switch.

4. In an electric system, a main circuit to be controlled, a first electromagnetic switch for controlling the main circuit, a two-position switch having normally closed and normally open contacts, a delayed operation electromagnetic switch having normally closed contacts and the first electromagnetic switch being energized through the closed contacts of the delayed operation switch and through the normally open contacts of the two-position switch when closed, a winding of the delayed operation switch having an electric energy storage means in parallel therewith and both the energy storage means and the winding of the delayed operation switch being energized through the normally closed contacts of the two-position switch, whereby when the two-position switch is in its normal position with the normally closed contacts closed, the energy storage means and the winding of the delayed operation switch may be energized and remain energized to open the contacts of the delayed operation switch to prevent energization of the winding of the first switch, and, upon movement of the two-position switch to close the normally open contacts and open the normally closed contacts, energy from the energy storage means may discharge through the winding of the delayed operation switch permitting it to close after a predetermined time interval and thereupon to cause energization of the winding of the first switch through the contacts of the delayed operation switch and the now closed normally open contacts of the two-position switch.

ROSS J. PLAISTED.